United States Patent [19]

Mells

[11] Patent Number: 5,197,381
[45] Date of Patent: Mar. 30, 1993

[54] VEHICLE SUPPORTED, COLLAPSIBLE PORTABLE SEATING DEVICE

[76] Inventor: Henry M. Mells, 110 Jackson Moss Rd., Tuskegee, Ala. 36088

[21] Appl. No.: 480,894

[22] Filed: Feb. 16, 1990

[51] Int. Cl.⁵ .............................................. A47B 23/00
[52] U.S. Cl. ......................................... 108/44; 108/48
[58] Field of Search ................ 108/44, 42, 46, 47, 108/48, 25; 240/152; 297/254, 255, 257, 14; 224/42.03 R, 42.07, 42.31

[56] References Cited

U.S. PATENT DOCUMENTS

| | | | |
|---|---|---|---|
| 839,944 | 1/1907 | Martin | 297/254 |
| 2,327,288 | 8/1943 | Post | 297/254 X |
| 2,671,977 | 3/1954 | Lingard | 108/46 X |
| 2,818,180 | 12/1957 | Keene | 108/25 |
| 3,217,668 | 11/1965 | Hopper | 108/25 |
| 3,799,071 | 3/1974 | Gerlach | 108/46 |
| 4,452,151 | 6/1984 | Jarrard | 108/44 |
| 4,461,220 | 7/1984 | Wetzel | 248/156 X |
| 4,583,253 | 4/1986 | Hall | 297/250 X |

*Primary Examiner*—José V. Chen
*Attorney, Agent, or Firm*—Jerome J. Norris

[57] ABSTRACT

A portable, collapsible bench-like outdoor seating platform attachable to the trunk of an automobile or to the cargo bed of a pick-up truck by a pair of hooks connected to adjustable straps, wherein the seating platform includes integral compartments and accommodations for necessary articles such as a shoe horns, brushes, towels, beverage containers and other items that would need to be convenienty accessible to persons changing into sporting or athletic attire.

5 Claims, 2 Drawing Sheets

VEHICLE SUPPORTED, COLLAPSIBLE PORTABLE SEATING DEVICE

FIELD OF THE INVENTION

This invention generally relates to a portable, collapsible seating device, supported at one end by a vehicle wall and at the other end by foldable legs placed upon the ground, wherein the device includes storage space for receiving small and necessary items that may be helpful for changing into sporting or athletic attire.

BACKGROUND OF THE INVENTION

Vehicle mounted and collapsible or folding seats are well known, and include seating apparatus that may be fastened to the bumper, to the lid of the trunk of an automobile, or connected to the trunk bed by complex hardware arrangements. Some prior art collapsible or folding seats include various types of receptacles for carrying associated articles.

One such collapsible or folding seat is disclosed in U.S. Pat. No. 1,900,847 to Siday wherein, defined under a hinged seat portion, is a box which can be used as a receptacle for carrying various articles. The legs of the collapsible seat are hinged to the base so as to fold up into a space or recess found under a fake bottom; however, articles contained in the box under the seat portion cannot be accessed while the user is seated.

U.S. Pat. No. 1,956,696 to Rice discloses a folding camp washstand, including integral accommodations for an adjustable mirror, comb, brush, soap, towels and other toilet items.

U.S. Pat. No. 2,834,398 to Thelan discloses a concealable seat and/or table attachment for vehicles, wherein the seat and/or table attachment may be secured and foldably and compactly concealed within the trunk compartment of a vehicle or automobile through the use of relatively elaborate and permanent hardware and fittings.

U.S. Pat. No. 3,709,159 to Oglesby, Jr. discloses a folding table for use in conjunction with an automobile trunk, including a folding leg frame and a trunk wall engaging adaptor at the other end.

U.S. Pat. No. 3,865,431 to Zakhi discloses a foldable seat adapted to be removably attached to a particular type of automobile bumper; however, modern automobile bumpers include integrally molded fairings which generally preclude mating with any specific foldable seat.

U.S. Pat. No. 4,403,806 to Stephen discloses a portable seating apparatus that may be removably mounted upon golf cart wheels.

U.S. Pat. No. 4,452,151 to Jarrard discloses a folding table and carrying support for use in an automobile trunk. The folding table incorporates guide rollers and channel members, secured to the bottom of the trunk lid.

U.S. Pat. No. 4,494,465 to Fick, Jr. discloses a folding table for use with an automobile trunk, wherein the table has at one end long, adjustable ground contacting legs, and on the other end, short adjustable legs that rest on the floor of the trunk.

SUMMARY OF THE INVENTION

The present invention seating device overcomes the disadvantages of the known prior art seating devices in that it provides a stable, collapsible seating platform device that is lightweight, compact when folded, simply constructed and inexpensive.

The present invention incorporates conveniently located storage spaces, a padded seating surface, two hingedly foldable legs, and two integral hook and adjustable straps for attachment to a vehicle.

In its fully deployed configuration, the present invention provides the user with a comfortable and reliable seating surface that is suitable for use at outdoor sporting events, whereby the user may effortlessly change into proper sporting attire.

Among other things the present invention is useful for the following purposes: changing socks and shoes, tallying scores, applying protective bandages, tending to physical injuries, or merely observing a game.

The integral storage spaces located on the outside of the foldable legs of present invention provide the user with an efficient and convenient location for items that are necessary for preparing to participate in a sporting or athletic event, or for observing the event. Such necessary items may include, but are not limited to, a shoe horn, shoe rack or holder, beverage container and/or a first aid kit.

BRIEF DESCRIPTION OF THE DRAWINGS

The above-referenced, and other objectives and advantages of the vehicle supported, collapsible seating device of the invention will become readily apparent and better understood by reference to the following drawing figures, which set forth the structure embodying the features of the invention and the principles thereof that are considered to be the best mode in which to apply these principals wherein.

DETAILED DESCRIPTION OF THE INVENTION

Figure 1:
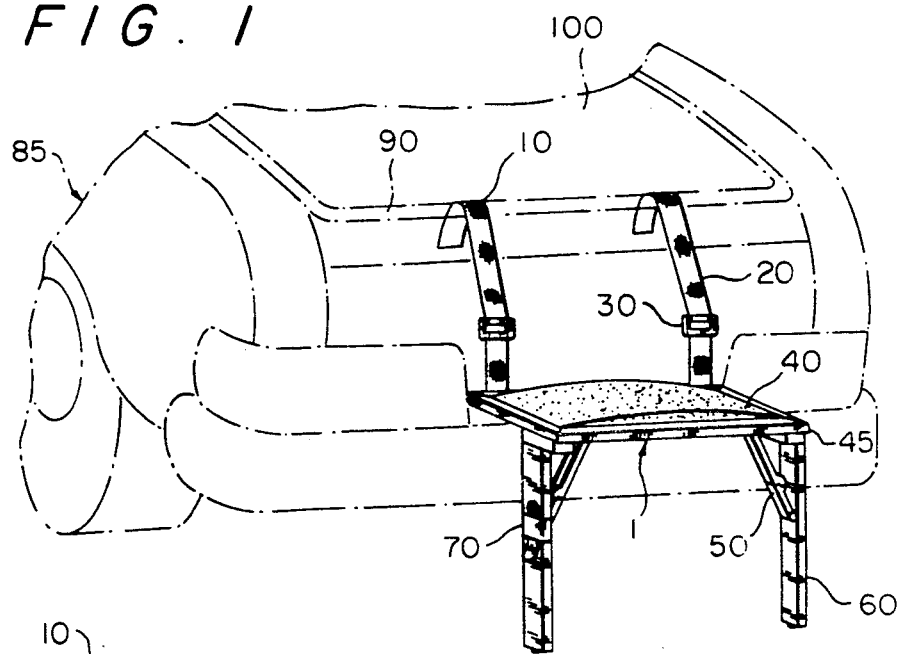
FIG. 1 shows an overall view of the portable folding seating device in its fully deployed configuration, indicating the major features of the first embodiment.

Referring now to the reference characters shown in drawing FIGS. 1-4, specifically to FIG. 1 first, it will be understood that the seating device 1 may be used in conjunction with the rearward wall 90 of an automobile trunk 100. FIG. 1 shows the seating device 1 in its fully deployed configuration, with the lid of the trunk space 100 in an open position.

Rigid arcuate shaped hooks 10 engage the wall 90 thereby providing a means of attaching and supporting the seating platform 45. The hooks 10 are connected to straps 20, which are made adjustable by way of a buckle 30. Each strap 20 is provided with one buckle 30. The adjustable straps compensate for the height of the trunk wall 90 in order that the seating platform will be parallel to the ground when the foldable legs 60 of the collapsible seating platform device are extended and locked in position.

Figure 2:
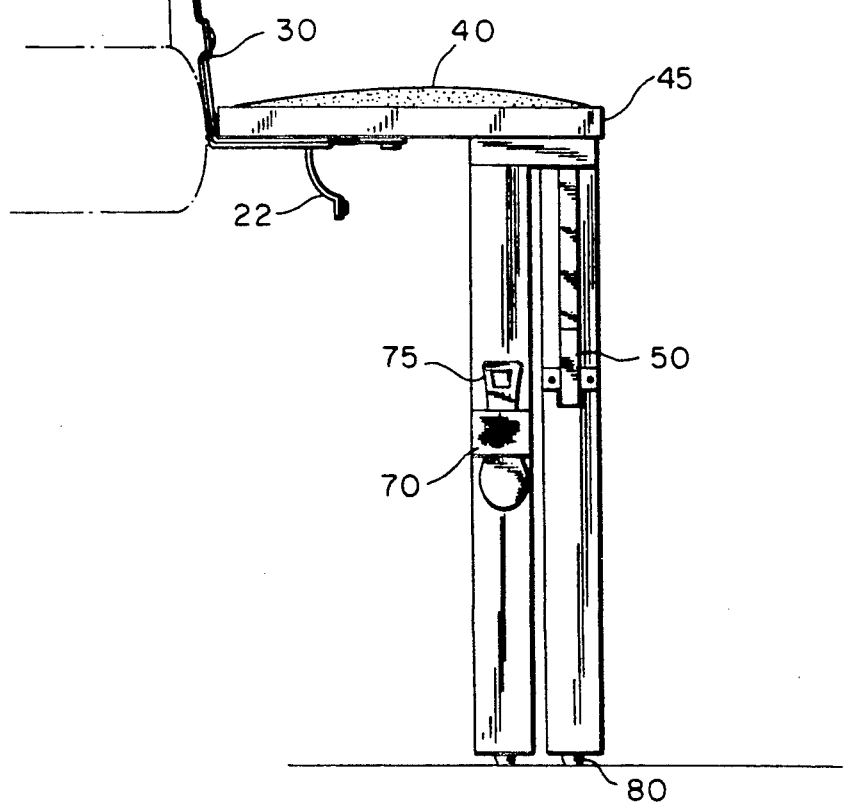
FIG. 2 shows a side view of the portable folding seating device in its fully deployed configuration, indicating additional features of the first embodiment.

FIG. 2 shows an exemplary storage location 70 for small articles such as a shoe horn, comb or brush, score card and pencil, or other objects useful to the person seated upon seating platform 45. Small articles, such as the shoe horn 75 may be accessed easily while the person is still in a seated position. The seating platform 45 is padded 40 in order to provide maximum comfort. The hooks 10 must be placed over the wall 90 of the trunk 100 of an automobile and the straps 20 connected to the hooks 10 via rivetting, etc. must be adjusted by the buckle 30, in order for the seating platform 45 to be level. Although an automobile trunk is shown herein, it is contemplated that the seating device of the invention be suitable for use on the tailgate of a station wagon, or on the sidewall of the cargo bed of a pick up truck.

The bottom of each leg 60 is provided with end caps 80, in order not to damage the bottom of the legs or render irregular in level, the ground surface upon which the folding seating device is placed. Instead of end caps however, it is possible to use load distributing plates when needed for use on a muddy surface, or non-slip ice pick spikes when the folding seat device is used on an icy surface.

Figure 3:
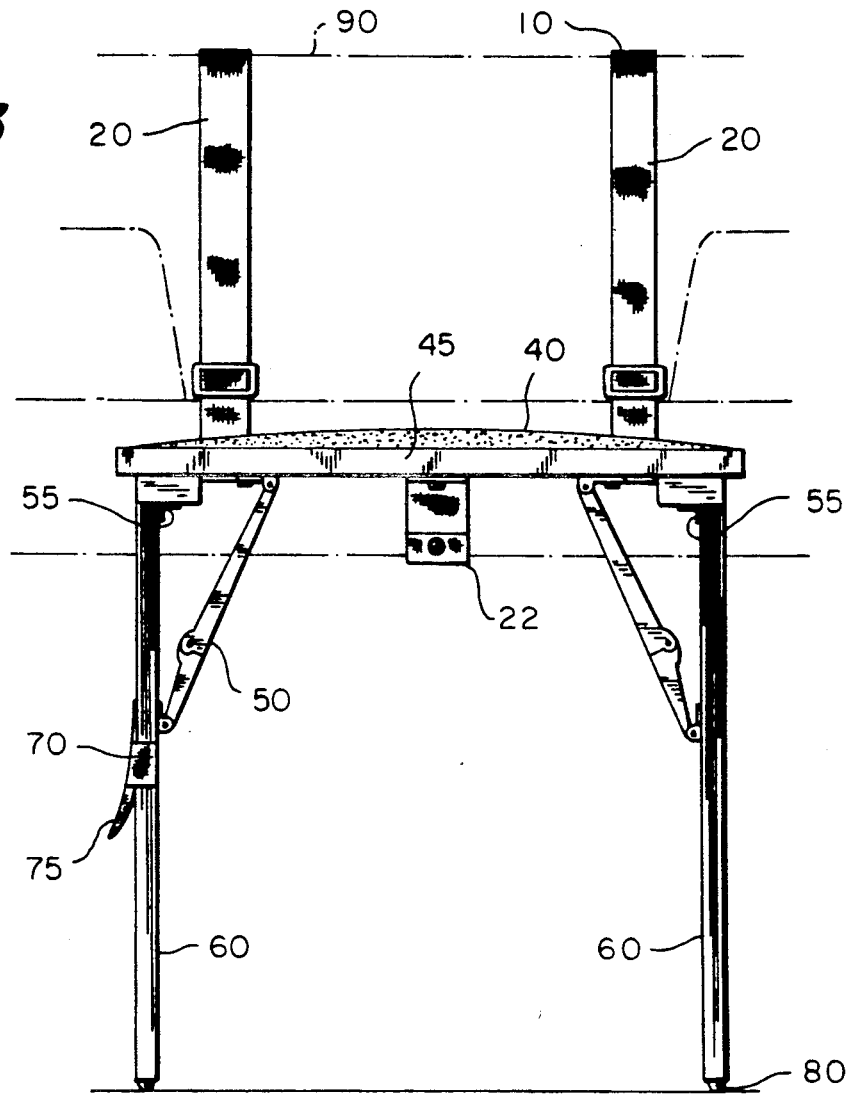
FIG. 3 shows a front view of the portable folding seating device in its fully deployed configuration.

The foldable legs 60 as shown in FIG. 3 show the invention in its full upright position and ready for use. The legs are supported by locking braces 50, which serve to provide lateral support for the seating device. The locking braces 50 are connected to the bottom surface of the seating platform by screws, nails or the like, and the legs 60 are connected to the braces by screws, rivets or other suitable fasteners Each leg 60 is provided with one locking brace 50. Each leg 60 is connected to the bottom surface of the seating platform 45 by a hinge 55, which provides the legs with angular movement between a folded and an extended position.

Figure 4:
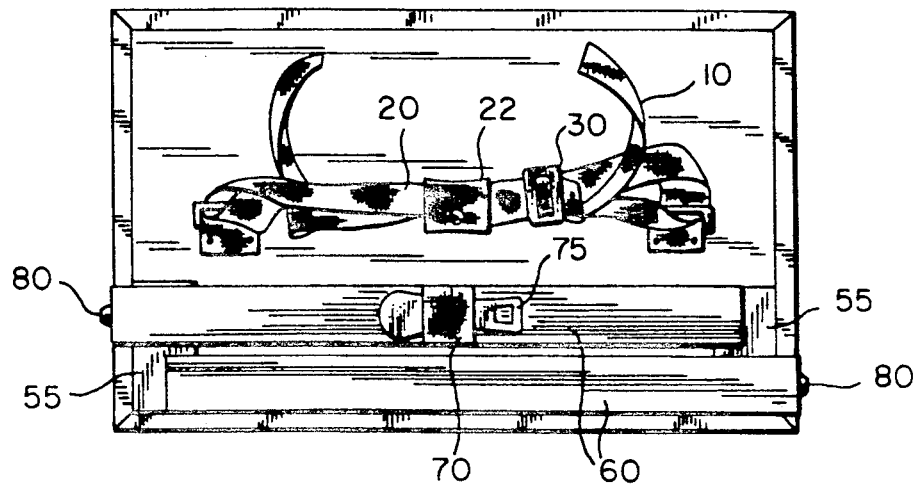
FIG. 4 shows a view of the portable folding seating device in its collapsed configuration.

Turning to FIG. 4, the invention is shown in a collapsed configuration and ready for storage or transport. The foldable legs 60 are easily folded due to the hinges which causes the legs 60 to rest in a side by side arrangement thereby making the invention more compact and streamlined. A retaining band and fastener 22 which is riveted at one end to the bottom of platform 45 serves to retain and position the flexible strap 20 so that the hooks 10 will be tucked away and may not inadvertently snag on unintended surfaces; however, the straps may be secured by any suitable fastening devices. A button snap is shown here, but any reliable holding device will suffice for the purpose of confining the movement of the flexible straps and hook combination. It should be noted that the item storage features are recessed when the apparatus is folded, due to the location of the storage spaces 70. In order to facilitate transport and handling, it is also contemplated that the seating device of the invention may be provided with a handle or hand-spaced gripping recesses in order to facilitate lifting and positioning of the seating device.

I claim:

1. A vehicular wall supported collapsible and portable seating device having integral storage spaces for small articles, comprising:

a horizontal, planar seating platform supported on a forward edge by two vertically extending ground contacting foldable legs, and on a rearward edge by support means defined by two permanently attached flexible straps having arcuate shaped rigid hooks that are attachable over said vehicular wall to support said seating device; said legs each being hingedly connected to separate corners of said seating platform; said straps being located at coplanar corners of said seating platform, whereby, the platform establishes a stable seat capable of supporting an adult when said legs are unfolded and positioned on a ground surface and when said hooks of said straps are securely attached over a vehicular wall; and wherein said device further comprises a retaining band and fastener riveted to a bottom surface of said platform to secure said flexible straps in a folded position so that said seating device may be easily transported or stored when said legs are folded.

2. The device of claim 1, wherein said hooks are capable of sustaining said seating device and an adult-sized person, and said flexible straps are adjustable in length to vary heights of the rearward edge of said seating platform and whereby the seating platform is reliable supported when said hooks are engaged over a wall edge of an open space on a motor vehicle body.

3. The device of claim 2, further comprising integrally formed storage spaces located on outwardly facing surfaces of said legs of said seating platform, whereby small articles useful to a user can be handily accessed from a seated position.

4. The device of claim 3, further comprising a padded platform.

5. The device of claim 4, wherein end caps are load distributing plates are disposed at bottoms of said legs.

* * * * *